United States Patent
Christensen

(10) Patent No.: US 10,620,057 B2
(45) Date of Patent: Apr. 14, 2020

(54) TUBULAR WIRE SHIELDING FOR AN EXHAUST GAS TEMPERATURE SENSOR ARRANGEMENT, EXHAUST GAS TEMPERATURE SENSOR ARRANGEMENT AND METHOD FOR ASSEMBLING AN EXHAUST GAS TEMPERATURE SENSOR ARRANGEMENT

(71) Applicant: Danfoss A/S, Nordborg (DK)

(72) Inventor: Tom Christensen, Nordborg (DK)

(73) Assignee: DANFOSS A/S, Nordborg (DK)

( * ) Notice: Subject to any disclaimer, the term of this patent is extended or adjusted under 35 U.S.C. 154(b) by 252 days.

(21) Appl. No.: 15/696,314

(22) Filed: Sep. 6, 2017

(65) Prior Publication Data
US 2018/0120165 A1    May 3, 2018

(30) Foreign Application Priority Data

Nov. 3, 2016    (DK) .................................. 2016 00677

(51) Int. Cl.
*G01K 1/00*    (2006.01)
*G01K 7/00*    (2006.01)
(Continued)

(52) U.S. Cl.
CPC ............... *G01K 1/08* (2013.01); *G01K 7/183* (2013.01); *G01K 13/02* (2013.01); *G01K 2013/024* (2013.01)

(58) Field of Classification Search
USPC .......................... 374/148, 144, 208, 185, 163
See application file for complete search history.

(56) References Cited

U.S. PATENT DOCUMENTS

| 3,408,867 A | 11/1968 | Henricks et al. |
| 4,499,330 A * | 2/1985 | Pustell .................... G01K 7/02 136/230 |

(Continued)

FOREIGN PATENT DOCUMENTS

| CN | 1721830 A | 1/2006 |
| CN | 101438461 A | 5/2009 |

(Continued)

*Primary Examiner* — Mirellys Jagan
(74) *Attorney, Agent, or Firm* — McCormick, Paulding & Huber PLLC

(57) ABSTRACT

The present invention relates to a tubular wire shielding (9) for an exhaust gas temperature sensor arrangement (1), the tubular wire shielding (9) comprising a first shielding tube (13) comprising one or more through channels for accommodating one or more wires (6a, 6b, 8a, 8b, 11a, 11b) and/or for accommodating one or more temperature measurement sensors (7), the tubular wire shielding (9) furthermore comprising a second shielding tube (14) radially surrounding the first shielding tube (14). It is an object of the invention to provide a tubular wire shielding (9) and an exhaust temperature sensor arrangement (1) which are of good mechanical stability. The object is solved in that the tubular wire shielding (9) comprises a first tube adhesive layer (15) arranged interposed between the first shielding tube (13) and the second shielding tube (14), the first tube adhesive layer (15) fixing the first shielding tube to the second shielding tube (14). Furthermore, the object is solved by an exhaust gas temperature sensor arrangement (1), preferably comprising such a wire shielding (9), and a method for assembling the exhaust gas temperature sensor arrangement (1).

24 Claims, 9 Drawing Sheets

(51) Int. Cl.
*G01K 1/08* (2006.01)
*G01K 7/18* (2006.01)
*G01K 13/02* (2006.01)

(56) References Cited

U.S. PATENT DOCUMENTS

| | | | | |
|---|---|---|---|---|
| 5,242,226 | A * | 9/1993 | Ross | G01K 1/10 136/233 |
| 5,999,081 | A * | 12/1999 | Hannigan | G01K 1/10 338/229 |
| 7,080,941 | B1 * | 7/2006 | Benjamin | G01K 1/08 374/141 |
| 8,672,541 | B2 * | 3/2014 | Ito | G01K 1/08 374/141 |
| 2004/0227519 | A1 | 12/2004 | Gul | |
| 2006/0013282 | A1 | 1/2006 | Hanzawa et al. | |
| 2008/0232428 | A1 * | 9/2008 | Ripley | G01K 1/08 374/208 |
| 2009/0296781 | A1 | 12/2009 | Weber et al. | |
| 2012/0039362 | A1 | 2/2012 | Pedersen et al. | |
| 2013/0243036 | A1 | 9/2013 | Scervini et al. | |
| 2016/0252404 | A1 | 9/2016 | Terada et al. | |

FOREIGN PATENT DOCUMENTS

| | | |
|---|---|---|
| CN | 102804287 A | 11/2012 |
| CN | 102870169 A | 1/2013 |
| CN | 102918714 A | 2/2013 |
| CN | 104115358 A | 10/2014 |
| JP | H07333071 A | 12/1995 |
| WO | WO2014/125078 A1 | 8/2014 |

* cited by examiner

TUBULAR WIRE SHIELDING FOR AN EXHAUST GAS TEMPERATURE SENSOR ARRANGEMENT, EXHAUST GAS TEMPERATURE SENSOR ARRANGEMENT AND METHOD FOR ASSEMBLING AN EXHAUST GAS TEMPERATURE SENSOR ARRANGEMENT

CROSS-REFERENCE TO RELATED APPLICATION

This application claims foreign priority benefits under U.S.C. § 119 to Denmark Patent Application No. PA201600677 filed on Nov. 3, 2016, the content of which is hereby incorporated by reference in its entirety.

TECHNICAL FIELD

The present invention relates to a tubular wire shielding for an exhaust gas temperature sensor arrangement, the tubular wire shielding comprising a first shielding tube, the first shielding tube comprising one or more through channels for accommodating one or more wires and/or for accommodating one or more temperature measurement sensors, the tubular wire shielding furthermore comprising a second shielding tube radially surrounding the first shielding tube.

Furthermore, the present invention relates to an exhaust gas temperature sensor arrangement.

Furthermore, the present invention relates to the exhaust gas temperature sensor arrangement, the sensor arrangement comprising one or more temperature measurement sensors, a connection cable, a wire arrangement arranged to electrically connect the one or more temperature measurement sensors via the connection cable, the wire arrangement comprising one or more pairs of wires which are conductors of the connection cable and one or more tubular wire shieldings, preferably one or more tubular wire shieldings according to the invention, each tubular wire shielding radially surrounding at least one wire of the wire arrangement by providing a through channel accommodating the at least one wire.

Furthermore, the invention relates to a method for assembling an exhaust gas temperature sensor arrangement comprising a tubular wire shielding radially surrounding one or more wires of a wire arrangement, the wire arrangement comprising one or more pairs of conductors for electrically connecting a temperature measurement sensor via a connection cable of the exhaust gas temperature sensor arrangement.

BACKGROUND

WO 2014/125078 A1 teaches a thermoelectric high-temperature sensor. The thermoelectric high-temperature sensor comprises a thermocouple and a sheath shielding the thermocouple wires. Furthermore, said document discloses two welding spots connecting the pair of thermocouple wires to a connection cable of the thermoelectric high-temperature sensor outside of the sheath. Furthermore, the sheath comprises two segments having different outer diameters.

US 2012/0039362 A1 discloses a temperature sensor unit. Two temperature sensors are connected to conductors of a cable connection via two wires each. Each of the four connections to the cable is established inside a tubular wire shielding. The temperature sensors are arranged closer to the radial wall of the wire shielding than the conductors. The temperature sensors are furthermore arranged in linear extension of their respective wires.

SUMMARY

The object of the invention is to provide a tubular wire shielding, an exhaust gas temperature sensor arrangement, and a method for assembling an exhaust gas temperature sensor arrangement which offer a good mechanical stability.

In one aspect, the object is solved by a tubular wire shielding as described in the outset, in which the tubular wire shielding comprises a first tube adhesive layer arranged interposed between the first shielding tube and the second shielding tube, the first tube adhesive layer fixing the first shielding tube to the second shielding tube.

Such a shielding design may be referred to as "sandwich design". Exhaust temperature sensor arrangements are often subjected to high temperatures and strong vibrations. Thus, there is a risk that the temperature sensors fail due to mechanical stress. For example, elements of the exhaust gas temperature sensor arrangement may break, leading to failure of the temperature sensor arrangement.

Forming two or more shielding tubes in a single unit by applying an adhesive in between neighboring shielding tubes provides good stability. In case vibrations occur, the vibrations would need to break three or more layers of the tubular wire shielding before the tubular wire shielding would fail, thus at least the first shielding tube, the second shielding tube and the first tube adhesive layer fixing the first shielding tube to the second shielding tube.

A tube adhesive layer in the sense of the present invention may be of a tubular shape. In embodiments the tube adhesive layer may completely fill a space between two shielding tubes, one of the shielding tubes radially surrounding the other. However, in some embodiments the tube adhesive layer may, for example, be formed by one or more adhesive spots arranged separate from each other in said space and fixing the shielding tubes adjacent to it to each other. The tube adhesive layer is in some embodiments a net structure. Thus, it should be clear that the tube adhesive layer only preferably is a closed and/or tubular layer in between the neighboring shielding tubes.

Preferably, the first tube adhesive layer comprises a ceramic adhesive. Ceramic adhesives can be very stable under mechanical stress. The ceramic adhesive can provide a firm permanent connection between the first shielding tube and the second shielding tube. In some embodiments, the first tube adhesive layer comprises magnesium oxide, preferably magnesium oxide powder. Furthermore, in some embodiments of the invention, the first tube adhesive layer comprises sand. In some embodiments, the first tube adhesive layer comprises a cure for hardening the adhesive. This may help to cure the first tube adhesive layer quickly.

In a preferred embodiment of the invention, the tubular wire shielding comprises a third shielding tube radially surrounding the second shielding tube, the tubular wire shielding comprising a second tube adhesive layer arranged interposed between the second shielding tube and the third shielding tube, the second tube adhesive layer fixing the second shielding tube to the third shielding tube. This embodiment can be even more resistant to mechanical stress, preferably vibrations. The vibrations would need to break five layers, i.e. three shielding tubes and two tube adhesive layers, before the tubular wire shielding would fail. Therefore, the tubular wire shielding is highly stable when using this sandwich design. Having five or more layers is preferred when an RTD element is to be accommodated by the tubular wire shielding.

It is preferred that the second shielding tube and/or the third shielding tube are steel tubes while the first shielding tube is a ceramic tube. Preferably, the first shielding tube is a ceramic tube. It is furthermore preferred that the first shielding tube is of a round cylindrical shape. It is preferred that the first shielding tube comprises at least one through channel for accommodating one or more wires. The diameter of each through channel may be adapted to accommodate two or more wires electrically isolated from each other. Preferably, the first shielding tube comprises two or more through channels, in some embodiments four through channels. Preferably, each through channel is adapted to accommodate exactly one wire. The one or more through channels preferably extend lengthwise through the first shielding tube. A preferred second shielding tube is a steel tube. Preferably, the second shielding tube is of a round cylindrical shape. The second shielding tube comprises one through channel for accommodating the first shielding tube. Preferably, the through channel of the second shielding tube extends lengthwise through the second shielding tube. A preferred third shielding tube is a steel tube. Preferably, the third shielding tube is of a round cylindrical shape. The third shielding tube comprises a through channel for accommodating the second shielding tube. The through channel of the third shielding tube extends lengthwise through the third shielding tube preferably. A ceramic tube is useful for electrically isolating wires from each other. Furthermore, it may be reasonably stable in view of mechanical stress, for example vibrations. A steel tube provides a good reinforcement of the tubular wire shielding. As the first shielding tube may electrically isolate the wires from each other and the environment, a steel tube surrounding the first shielding tube is no draw-back.

Preferably, the second tube adhesive layer is different from the first tube adhesive layer regarding a material composition. In some embodiments, the first tube adhesive layer and the second tube adhesive layer are identical regarding the material composition. However, it may be advantageous that the material composition of the first tube adhesive layer and the material composition of the second tube adhesive layer are different from each other. For example, the first tube adhesive layer may comprise sand and/or the second tube adhesive layer may comprise sand. The first tube adhesive layer is in some embodiments thicker in a radial extension than the second tube adhesive layer or vice versa. The radially thinner of the two adhesive layers may in such case preferably comprise sand and/or magnesium oxide.

It is preferred that the tubular wire shielding comprises a tubular segment comprising a cavity for accommodating one or more temperature measurement sensors, preferably for accommodating the RTD element. RTD stands for Resistance Temperature Detector. Said tubular segment may thus help to protect such a temperature measurement sensor. Thus, instead of or in addition to one, two or more through channels adapted for accommodating one or more wires each, said tubular segment may comprise a single cavity, preferably in the first shielding tube. It is preferred that the cavity is arranged in lengthwise extension of the one or more through channels for the wire. Thus, preferably through channels adapted for accommodating the wire extend only in one lengthwise direction from the cavity. It is preferred that the cavity is designed as a through channel. This allows easy accommodation of the temperature measurement sensor.

Preferably, the second shielding tube concentrically surrounds the first shielding tube. Preferably, the third shielding tube concentrically surrounds the second shielding tube. It is preferred that tubular segments of the tubular wire shielding have a same longitudinal extension. The tubular wire shielding may just comprise exactly one tubular segment. However, having two or more tubular segments forming the tubular wire shielding is preferred. It allows to arrange a number of tubular segments around the wires depending on the length of the wire. This may allow easier assembly of the exhaust gas temperature sensor arrangement as the tubular wire shielding can be formed of multiple tubular segments instead of providing a customized single tubular segment for each wire length.

In a further aspect, the object of the invention is solved by an exhaust gas temperature sensor arrangement comprising a tubular wire shielding as described above.

The tubular wire shielding incorporating the sandwich design leads to good mechanical stability when installed in an exhaust gas temperature sensor arrangement.

In a further aspect, the object of the invention is solved by an exhaust gas temperature sensor arrangement as described in the outset, in which at least one temperature measurement sensor is the RTD element, at least one wire of the wire arrangement contacting the RTD element being electrically connected to the RTD+element outside of the through channel formed by the tubular wire shielding and accommodating the wire and/or accommodating the RTD element and/or in which at least one temperature measurement sensor is an electrical junction, the electrical connection from the electrical junction to the pair of conductors comprising less than two welding connections.

Welding connections are likely to break due to vibration. Therefore, according to this aspect of the invention, welding connections are at best placed outside the tubular wire shielding which may often be subjected to vibrations, or, even better, completely omitted and replaced by other types of connectors less prone to fail when vibrating. This results in a very good mechanical stability.

In some embodiments, the wire arrangement consists of the pair of conductors of the connection cable, preferably when the temperature measurement sensor is an electric junction, the pair of conductors being preferably thermocouple wires welded to each other in a stripped section forming the electric junction. In some embodiments, the wire arrangement comprises one or more further pairs of wires, for example pairs of lines extending from the RTD-element, in addition to the pair of conductors of the connection cable, each further pair of wires connecting a corresponding temperature measurement sensor to pairs of conductors of the connection cable. In these embodiments, the additional pairs of wires may be thermocouple wires, preferably when the temperature measurement sensor is an electric junction for measuring temperature. Other wire arrangement configurations are possible, as will be described later in detail.

It is preferred that the temperature measurement sensor is electrically connected to at least one of the conductors by a screw connection arranged outside of the through channel. Thus, preferably at least one wire of the further pair of wires is electrically connected to a corresponding conductor of the cable by a releasable connection. A releasable connection may be advantageous for replacing single wires or the whole wire arrangement if necessary. Furthermore, it may be more reliable to use a releasable but firm connection instead of a welding connection which may possibly break under vibrational stress. A releasable connection may in some embodiments be a clip connection, a hooking connection or a bayonet-style connection. However, a screw connection is preferred as it may be very stable in situations where vibrations occur. Furthermore, maintenance of the wire arrangement can be facilitated by using the releasable screw connection. As the releasable connection may be arranged outside of the through channel of the tubular wire shielding, vibrations of the tubular wire shielding will less affect the connection between the temperature measurement sensor and the one or more conductors of the connection cable. Preferably, the screw connection is arranged outside an end of the tubular wire shielding and distant from the temperature measurement sensor. Thus, the opposite end of the tubular wire shielding is preferably arranged adjacent to the temperature measurement sensor, most preferably radially surrounding the temperature measurement sensor. Preferably, to achieve this, said end of the tubular wire shielding comprises the cavity for accommodating the temperature measurement sensor. However, in the alternative, the screw connection is arranged outside an end of the tubular wire shielding and adjacent to the temperature measurement sensor.

It is preferred that the exhaust gas temperature sensor arrangement comprises a terminal housing, the terminal housing comprising at least one screw terminal electrically connecting the temperature measurement sensor to a conductor of the connection cable. Preferably, the terminal housing is arranged adjacent to the end of the tubular wire shielding which is distant from the temperature measurement sensor. A preferred terminal housing is a B head connection type unit. The screw terminal is preferably a luster style terminal. Thus, the screw terminal may comprise a socket for the further wire and a socket for the corresponding conductor of the connection cable, the screw connection allowing to electrically contact the further wire to the corresponding conductor. This setting allows to protect the connection between the at least one further wire and the corresponding conductor of the cable without having to place the point of connection inside the tubular wire shielding. Inside the terminal housing, the point of connection may be well protected against vibrations.

It is preferred that the at least one wire of the wire arrangement is supported on a surface arranged inside of the terminal housing. This can stabilize the wire when vibrations occur. Preferably, the wire is supported on a side wall of the screw terminal. It may, in the alternative or additionally, be supported on a base plate of the screw terminal. The base plate is arranged inside of the terminal housing. Both options allow good mechanical stability, especially compared to having floating wires in the terminal housing. It is preferred that the base plate is fixed to the terminal housing by a screw connection, preferably by two fixation screws. This allows good fixation.

Preferably, at least one temperature measurement sensor is the RTD element and the RTD element is arranged interposed between wires of the wire arrangement electrically connecting the RTD element via the connection cable. A preferred RDT element is an element selected from the group of a PT element, a NTC element, a PTC element, and a KTY element. Preferred RTD elements are PT 100, PT 200, PT 500, and PT 1000 elements. Interposing the RTD element between the pair of wires thus having it arranged in an inverted position between the wires, allows to protect the RTD element in a cavity of a single segment of the tubular wire shielding, thus preventing splitting of the shielding of the RTD element into two segments. Preferred further wires connecting the RTD element to the corresponding conductors of the cable are nickel wires. When the temperature measurement sensor is an electrical junction instead of an RTD element, the further wires may be thermocouple wires. The pair of further wires connecting the electrical junction to the corresponding conductors of the cable preferably consists of a nickel wire and a chrome nickel alloy wire (R-type). In the alternative, the pair of wires in this case consists of a copper wire and a constantan wire (T-type) or a Nicrosil alloy wire and a Nisil alloy wire (N-type). The two thermocouple wires are welded together, preferably at ends of the pair of wires, so as to form the electrical junction as the temperature measurement sensor. As mentioned before, the pair of conductors of the connection cable may be stripped so as to connect the pair of conductors directly to the temperature measurement sensor or to weld them together so as to form the electrical junction. Then no further pair of wires is necessary.

It is preferred that the tubular wire shielding comprises two or more tubular segments of the same outer diameter, each of the tubular segments radially surrounding a different section of the at least one wire of the wire arrangement. Multiple segments may be lined up on the one or more wires one after another so as to allow flexibility in the length of the wire. Preferably, the length of the tubular wire shielding segments is the same for all tubular wire shielding segments of the tubular wire shielding. It is preferred that a front tubular wire shielding segment, preferably arranged adjacent to ends of the pair of wires distant from the corresponding conductors of the cable, may comprise a cavity for the temperature measurement sensor. The tubular wire shielding segments may, due to their reduced length compared to prior art, also be less prone to break under vibrational stress. The pair of wires may be the pair of conductors of the connection cable or a further pair of wires connected to the corresponding conductors.

Preferably, the tubular wire shielding of the exhaust gas temperature sensor arrangement is designed as the tubular wire shielding as described in view of the first aspect of the invention.

In a further aspect of the invention, the object of the invention is solved in a method as laid out in the outset which further comprises the step of fixing a first shielding tube of the tubular wire shielding to a second shielding tube of the tubular wire shielding, the second shielding tube radially surrounding the first shielding tube, by applying a first tube adhesive between the first shielding tube and the second shielding tube; and/or providing an RTD element as the temperature measurement sensor and electrically connecting at least one wire of the wire arrangement contacting the RTD element and the RTD-element with each other so as to electrically connect the RTD element via the connection cable and arranging said electrical connection to the RTD element outside a through channel formed in the tubular wire shielding; and/or providing an electrical junction as the temperature measurement sensor by welding a pair of thermocouple wires to each other, connecting the electrical junction electrically via the connection cable by forming less than two further welding connections.

In view of the other aspects of the present invention, as described above, it becomes clear that the method steps as claimed result in a mechanically stable exhaust gas temperature sensor which is especially resistant against vibrations.

It is preferred that the method comprises the step of providing two or more tubular segments of the tubular wire shielding serially on the same wire of the wire arrangement, at least two of the tubular segments having the same outer diameter. Therefore, the tubular wire shielding may be composed of different segments having the same outer diameter so that it is not necessary to provide different types of segments having different outer diameters.

Preferably, the method comprises the step of providing a temperature measurement sensor, preferably a RTD element. Preferably, one or more, more preferably, two or more tubular wire shielding segments are mounted one after another on wires extending from the temperature measurement sensor. One or both of the wires may be welded to corresponding conductors of the cable. However, it is preferred that one or both of the wires are connected to the corresponding conductors using a screw terminal instead of a welding connection. Preferably, one or both of the wires are connected to the corresponding conductors of the cable outside of through channels of the tubular wire shielding segments. One or both of the wires may be stripped conductors of the connection cable in the alternative. The shielding segments are, consequently, then mounted one after another on the conductors of the cable. Preferably, a sensor housing is provided and the temperature measurement sensor, the wire arrangement and the tubular wire shielding are inserted into the sensor housing. The sensor housing preferably has a reduced tip. Furthermore, a ring may be provided and the temperature measurement sensor housing may be beaded to the cable and the ring may be welded to an outer surface of the temperature measurement sensor housing. Furthermore, testing and packing may be performed. The method steps may be performed in the sequence as given above. However, it should be understood that the method steps may be performed in any order as long as the selected order leads to the desired result.

The method allows to reach a two day lead time which is very quick. The method furthermore allows to use the same production line for both, RTD element and electrical junction solutions. Therefore, assembling lines may be simplified and the assembly process may be easily switched from assembling exhaust gas temperature sensors comprising RTD elements to assembling exhaust gas temperature sensor arrangement comprising electrical junctions as temperature measurement sensors.

The method may comprise annealing of a steel tube when it is envisaged to provide a steel tube in the tubular wire shielding. This helps to avoid a sensor accuracy drift due to sensor aging at high temperatures. However, the annealing process can be avoided for exhaust gas temperature sensor arrangements which are expected to operate continuously below 400° C.

Providing one or more steel tubes in each segment of the tubular wire shielding is preferred when the temperature measurement sensor is the RTD element.

BRIEF DESCRIPTION OF THE DRAWINGS

In the following, exemplary embodiments of the invention will be described with reference to the attached drawings, in which.

DETAILED DESCRIPTION

Figure 1:
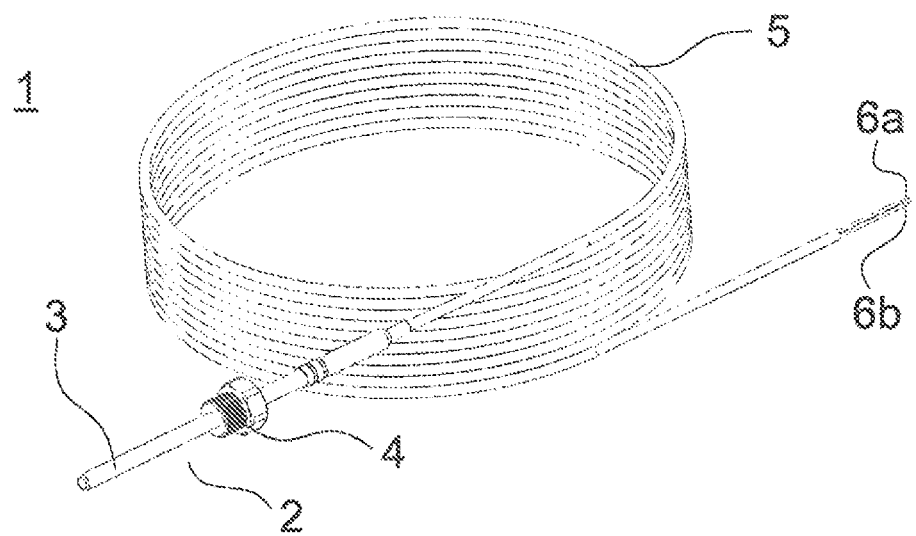
FIG. 1 shows a perspective view of an exhaust gas temperature sensor arrangement according to a first embodiment of the present invention.

In the following detailed description and the attached patent claims reference numerals are included so as to improve readability. The reference numerals are in no way meant to be limiting. Furthermore, the embodiments shown in the following are not meant to be limiting. It should be understood that features shown in one embodiment of the invention may be freely combined with features shown in other embodiments of the invention and with any feature described above.

FIG. 1 shows a perspective view of an exhaust gas temperature sensor arrangement 1 according to the invention. The exhaust gas temperature sensor arrangement 1 is meant to be used for measuring the exhaust gas temperature of vehicles, more specifically vehicles based on Diesel engines like cars or ships.

The exhaust gas temperature sensor arrangement 1 comprises a sensor head 2. The sensor head 2 comprises a sensor housing 3 and a ring 4 welded to the sensor housing 2 and connected to a union element.

The exhaust gas temperature sensor arrangement 1 further comprises a connection cable 5. The connection cable 5 comprises two conductors 6a, 6b. The conductors 6a, 6b each comprise an open end which allows to connect the exhaust gas temperature sensor arrangement 1 to an analysis device, like a computer (not shown).

The conductors 6a, 6b each comprise a connected end which is electrically connected to a temperature measurement sensor 7 (not shown in FIG. 1) which is housed inside the sensor housing 3. Therefore, the conductors 6a, 6b form part of a wire arrangement for electrically connecting the temperature measurement sensor via the connection cable 5. Further, as may be understood, in embodiments, the wire arrangement can comprise further pairs of wires 8a, 8b (not shown in FIG. 2) connected to the pair of conductors 6a, 6b and interposed between the pair of conductors 6a, 6b and the temperature measurement sensor 7, as described later in more detail. Thus, an elongated exhaust gas temperature sensor arrangement 1 is provided.

Figure 2:
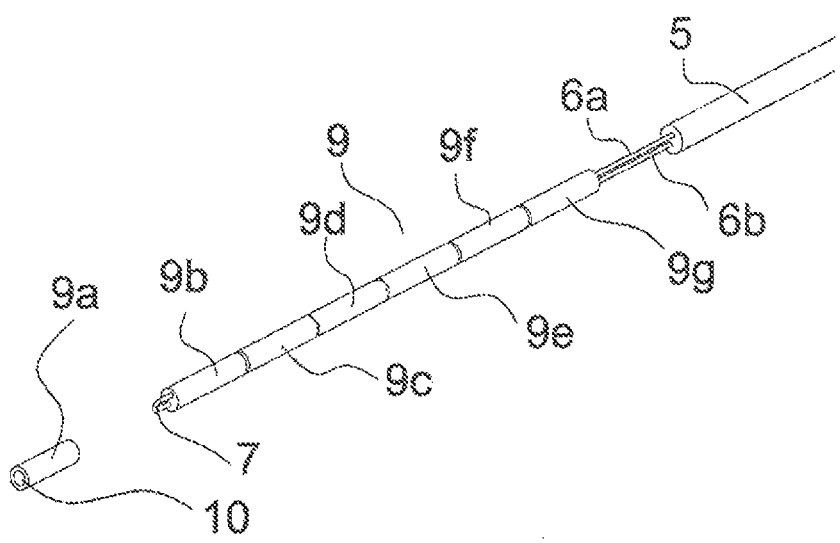
FIG. 2 shows a detailed view of a wire arrangement and a tubular wire shielding of the first embodiment.

FIG. 2 now shows that the conductors 6a, 6b provide for a temperature measurement sensor 7, which in this embodiment is an electrical junction. Therefore, the conductors 6a, 6b are thermocouple wires. One of the conductors 6a is a nickel wire and the other of the conductors 6b is a chrome-nickel alloy wire. Therefore, the thermocouple is a type K thermocouple.

The pair of conductors 6a, 6b is accommodated in two through channels formed in each of seven segments 9b to 9g of a tubular wire shielding 9. Thus, the tubular wire shielding 9 radially surrounds both conductors 6a, 6b of the wire arrangement. A further segment 9a of the tubular wire shielding 9 comprises a single cavity 10 for accommodating the temperature measurement sensor 7. In this embodiment, each segment 9a to 9g of the tubular wire shielding 9 merely consists of a ceramic tube comprising the two through channels, one for each of the conductors 6a, 6b. However, some embodiments comprise tubular wire shieldings 9 with more sophisticated designs, as will be discussed later.

The tube segments 9a to 9g are lined up one after another on the pair of conductors 6a, 6b and on the temperature measurement sensor 7 in an assembled state. The wire shielding segments 9a to 9g all have the same outer diameter. The wire shielding segments 9b to 9g have the same length. The further segment 9a is shorter than each of the segments 9b to 9g. However, all segments 9a to 9g are in some embodiments of the same length or all of them are of different length in other embodiments. Each segment 9a to 9g radially surrounds a different section of the two conductors 6a, 6b.

Having two or more tubular wire shielding segments 9a to 9g allows a good stability when the sensor housing 3 vibrates in a measurement location, for example an exhaust pipe. Furthermore, as the conductors 6a, 6b form the electric junctions, zero further welding connections are needed to connect the temperature measurement sensor 7 electrically via the cable.

In embodiments, each further wire 8a, 8b of the further pair of wires may be connected to the corresponding conductor 6a, 6b of the connection cable by means of a luster connection. Each luster connection may then be arranged inside the sensor head 3 but outside the tubular wire shielding 9. This positively affects the stability when vibrations occur as well.

Figure 3:
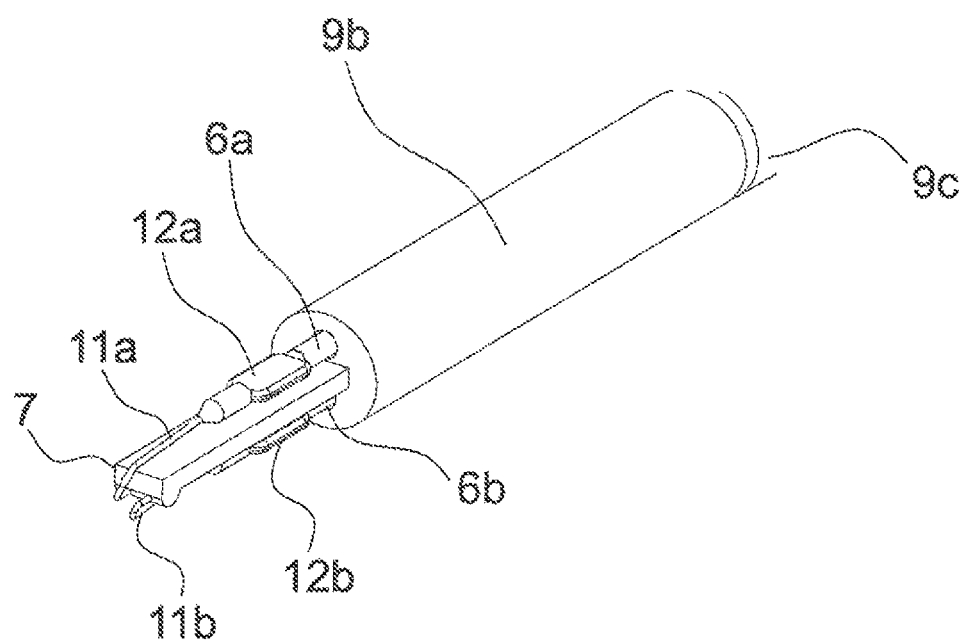
FIG. 3 shows a detail of a second embodiment of the invention in which the temperature measurement sensor is an RTD element.

FIG. 3 shows details of a further embodiment of the invention. Here, the temperature measurement sensor 7 is an RTD element, more specifically a PT1000 platinum sensor according to DIN EN 60751.

The temperature measurement sensor comprises further wires, here a pair of lines 11a, 11b, each connected to a corresponding conductor 6a, 6b. As in the embodiment no thermocouple is to be formed, just two nickel conductors 6a and 6b are provided and arranged accommodated inside the two through channels of the segments 9b and 9c. In a connection zone of the pair of conductors 6a, 6b and the pair of lines 11a, 11b, pressed sections 12a, 12b are provided in which each of the lines 11a, 11b of the pair of lines is pressed with the corresponding conductor 6a, 6b so as to allow a secured fit which is stable in case of vibrational stress occurs or during assembly. The RTD element is arranged interposed between the pair of conductors 6a, 6b. Furthermore, the RTD element is arranged interposed between the pair of lines 11a, 11b. In some embodiments, the RTD element is fully arranged interposed between the pair of conductors 6a, 6b. Having the RTD element arranged interposed between the pair of conductors 6a, 6b as shown may be referred to as inverted position. In this embodiment, the further segment 9a having the cavity may be arranged radially surrounding the RTD element. Again, the pair of wires may be the pair of conductors 6a, 6b as shown or an additional pair of wires 8a, 8b connected to the corresponding conductors 6a, 6b. Furthermore, the lines 11a, 11b may fully extend through the tubular wire shielding 9 and be connected to the conductors 6a, 6b outside of the tubular wire shielding 9.

It should be understood that in some embodiments the RTD element does not comprise lines 11a, 11b but the RTD element is connected directly to the corresponding conductors 6a, 6b of the connection cable 5.

Figure 4:
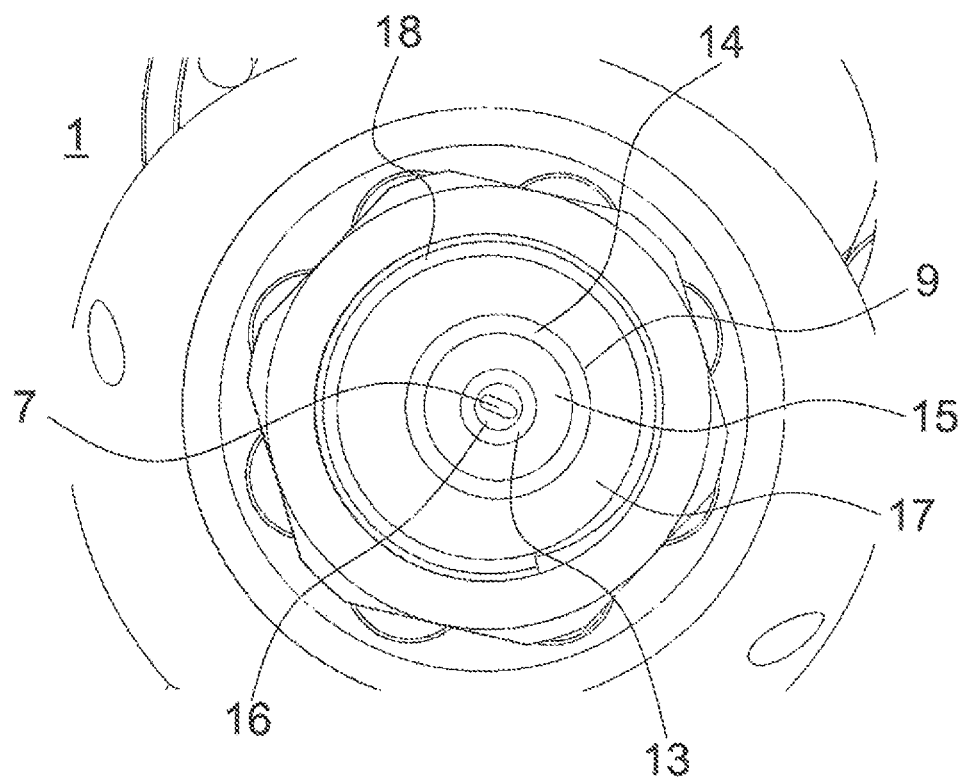
FIG. 4 shows an embodiment of the invention which comprises a first shielding tube adhered to a second shielding tube.

FIG. 4 shows an embodiment of a tubular wire shielding 9 according to the invention in detail. The tubular wire shielding 9 is arranged at an exhaust gas temperature sensor arrangement 1. The given front view along the longitudinal axis of the tubular wire shielding 9 shows that the tubular wire shielding 9 comprises a first shielding tube 13 radially surrounding the temperature measurement sensor 7, in this embodiment the RTD element. A second shielding tube 14 is arranged radially surrounding the first shielding tube 13. A first tube adhesive layer 15 is arranged interposed between the first shielding tube 13 and the second shielding tube 14 so as to radially fix the first shielding tube 13 to the second shielding tube 14.

The first shielding tube 13 shown in FIG. 4 is a ceramic tube. The second shielding tube 14 is a steel tube. The first tube adhesive layer 15 is a ceramic adhesive layer. Inside the through channel of the first shielding tube 13, a channel adhesive 16 is arranged, in this embodiment a ceramic adhesive. The ceramic adhesive is basically of the same material as in the first tube adhesive layer 15. However, additionally it comprises sand. The channel adhesive 16 fixes the elements arranged in the through channel of the first shielding tube 13 to the first shielding tube 13.

As can be seen in FIG. 4, a radial air gap 17 is provided between a radial sensor housing wall 18 surrounding the tubular wire shielding 9 and the second shielding tube 14. Thus, in this embodiment, the tubular wire shielding 9 consists of four layers, i.e. two shielding tubes 13, 14 and two adhesives 15, 16. Vibrational stress would therefore need to break all four layers before the function of the temperature measurement sensor 7 may fail. The tubular wire shielding 9 and the exhaust gas temperature sensor arrangement 1 are therefore of a good mechanical stability.

Figure 5:
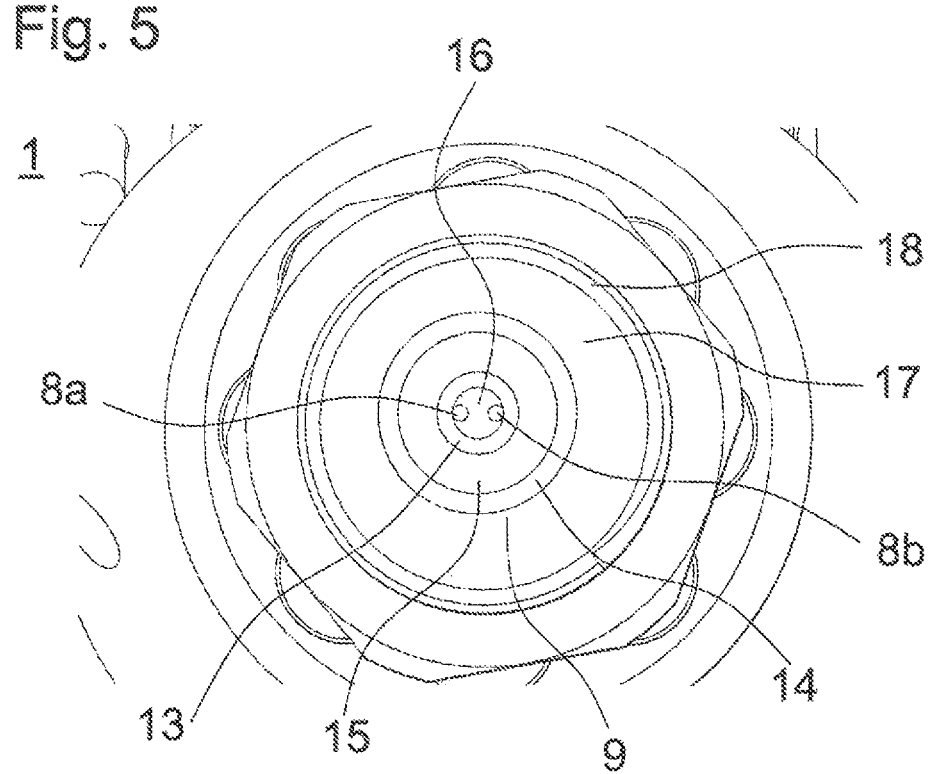
FIG. 5 shows a further embodiment of the invention which is similar to the embodiment shown in FIG. 4.

FIG. 5 shows a further embodiment of the tubular wire shielding 9 and the exhaust gas temperature sensor arrangement 1 according to the invention.

Here, the first shielding tube 13 comprises just one through channel and two further wires 8a, 8b are accommodated in the through channel electrically isolated from each other. The channel adhesive 16 inside the through channel fixes the two wires 8a, 8b to the first shielding tube 13. This helps to understand that no matter whether a RTD or a thermocouple element shall be installed in the exhaust gas temperature sensor arrangement 1, the same assembly method may be used. Of course, instead of the further wires 8a, 8b, the conductors 6a, 6b may be accommodated inside the through channel.

Even the same segments of the tubular wire shielding 9 may be used regardless whether a RTD element or a thermocouple is applied as long as the through channel of the first shielding tube 13 has a diameter large enough to accommodate either the RTD and/or the two wires of the wire arrangement.

Figure 6:
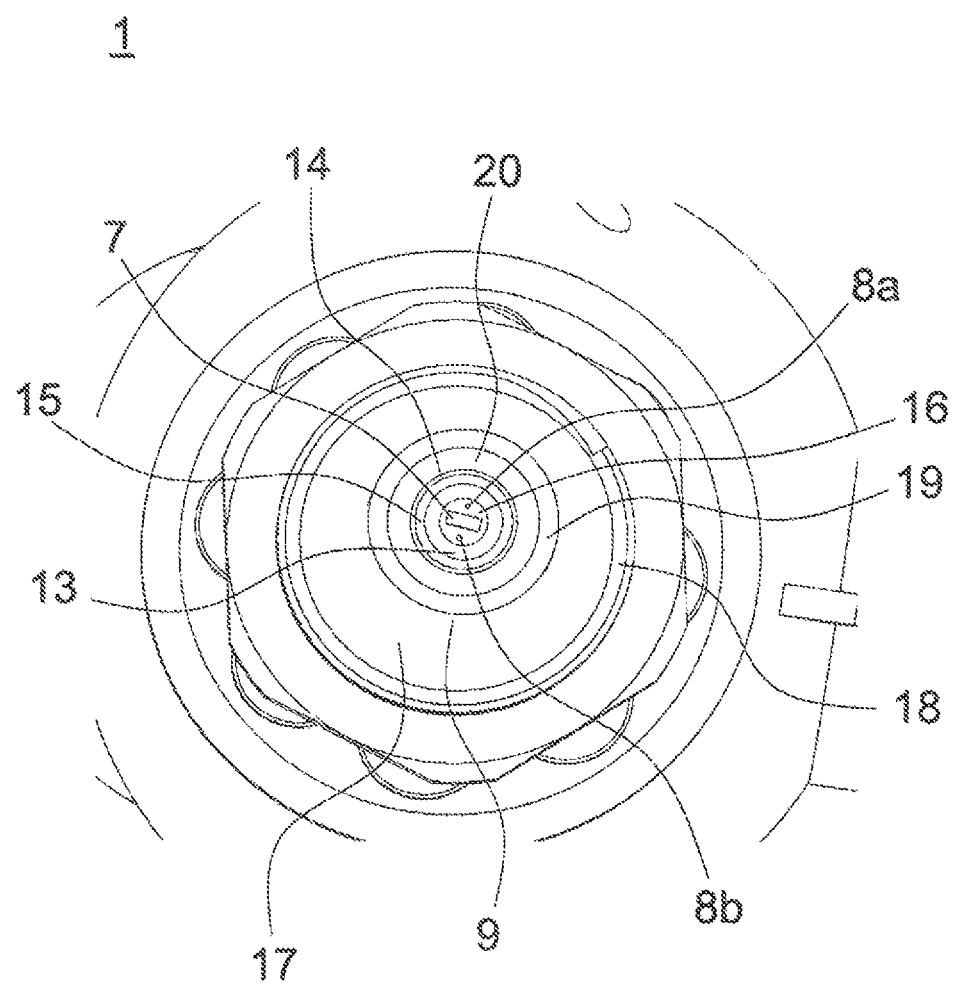
FIG. 6 shows an embodiment of the invention in which the tubular wire shielding comprises a first, a second and a third shielding tube.

FIG. 6 shows a further embodiment of the invention. Here, like in FIGS. 4 and 5, a view along the longitudinal extension of the tubular wire shielding 9 is depicted. However, a difference between this embodiment and the previous embodiments lies in that the tubular wire shielding 9 now comprises three shielding tubes 13, 14, 19. A third shielding tube 19 is arranged radially surrounding the second shielding tube 14. The third shielding tube 19 is a steel tube. Between the second shielding tube 14 and the third shielding tube 19, a second tube adhesive layer 20 is arranged. The second tube adhesive layer 20 comprises a ceramic adhesive and in this embodiment additionally sand. On the other hand, the first tube adhesive layer 15 is a ceramic adhesive comprising no sand. Therefore, the second tube adhesive layer 20 is different from the first tube adhesive layer 15 regarding a material composition. In the given embodiment, the first tube adhesive layer 15 and the second tube adhesive layer 20 both comprise magnesium oxide grains.

Figure 7:
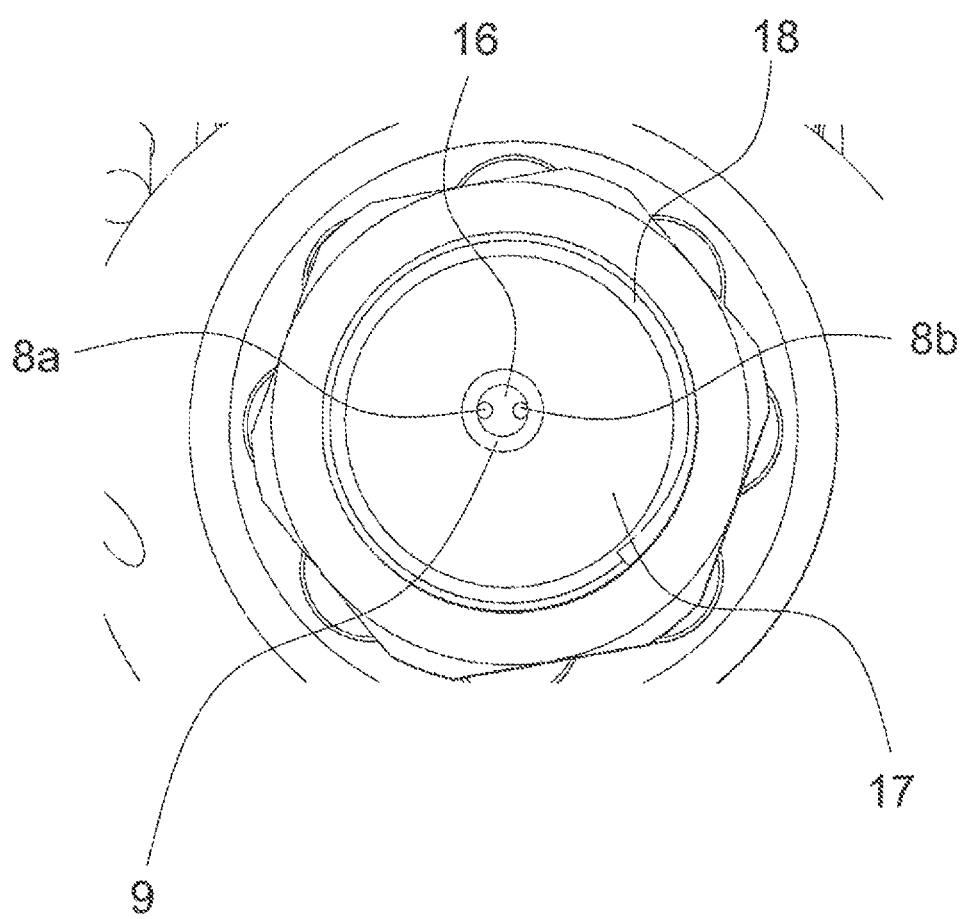
FIG. 7 shows an embodiment of the invention in which the tubular wire shielding comprises a single shielding tube.

FIG. 7 shows a further embodiment of the tubular wire shielding 9, now having just the single shielding tube which is a ceramic tube. This tubular wire shielding is applied in the embodiment according to the following FIG. 8.

Figure 8:
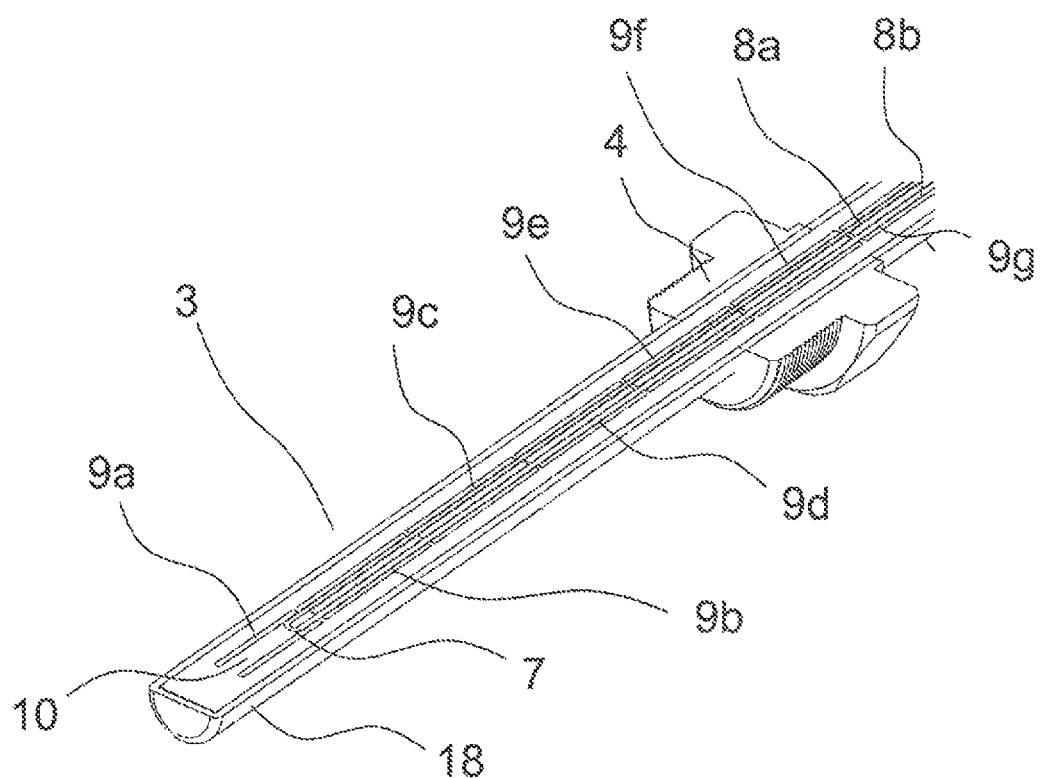
FIG. 8 shows a cross-sectional perspective view of a detail of an embodiment of the invention.

FIG. 8 gives a perspective cut view through an embodiment of the invention. As can be seen, a sensor housing 3 is shown. The temperature measurement sensor 7, in this embodiment an electrical junction, is provided by connecting a further pair of wires 8a, 8b at respective end sections to each other. Here, the connection was established by means of spot welding. The further pair of wires 8a, 8b consists of a constantan wire 8a and a copper wire 8b. Tube segments 9b to 9g of a tubular wire shielding 9, each tube segment comprising two through channels accommodating one of the wires 8a, 8b of the further pair of wires are part of the tubular wire shielding 9. The further pair of wires 8a, 8b is electrically connected to the pair of conductors 6a, 6b of the connection cable 5 outside the tubular wire shielding 9.

The further segment 9a comprises a cavity 10 accommodating the temperature measurement sensor 7. The remaining interior of the round cylindrical sensor housing 3 is filled with a ceramic adhesive. In some embodiments, as shown before, the tube segments 9a to 9g may be of the sandwich type, thus comprising two or more shielding tubes coaxially arranged with regards to each other and fixed to each other by means of an adhesive layer in between neighboring shielding tubes.

Figure 9:
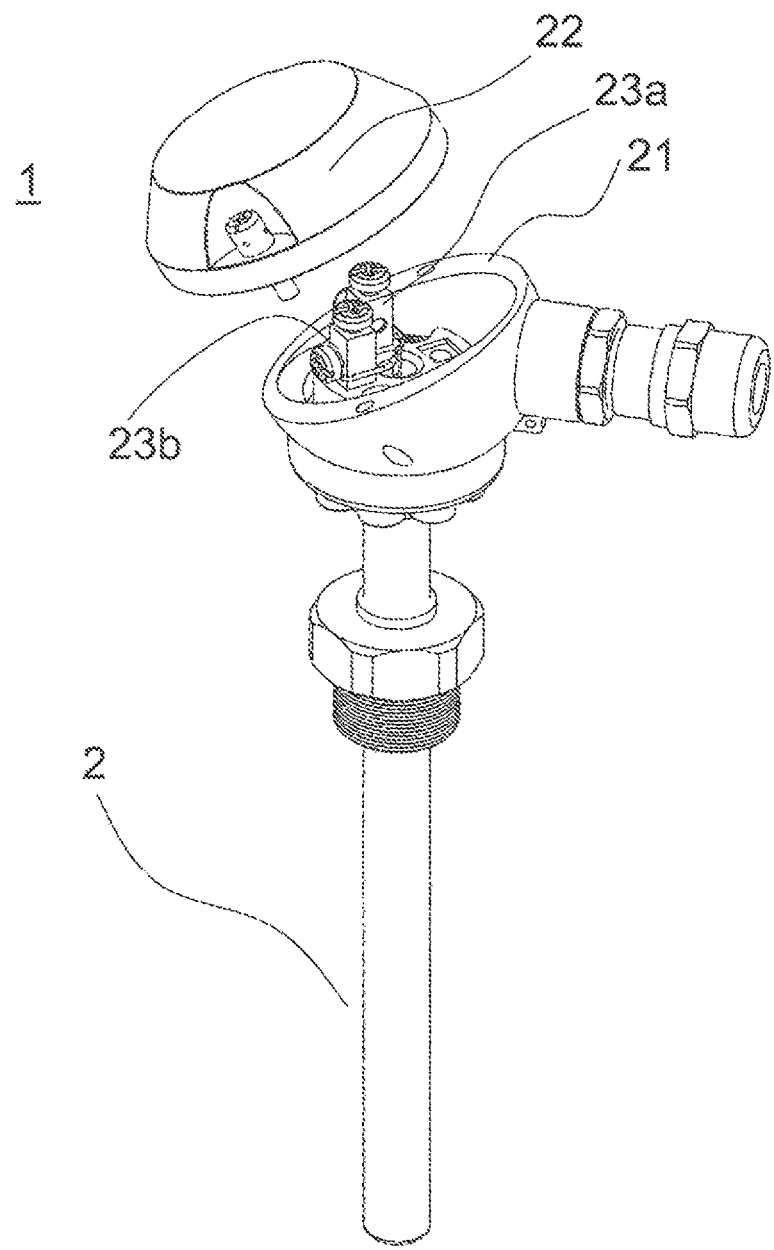
FIG. 9 shows an embodiment of the invention in which a terminal housing is implemented.

FIG. 9 now shows a preferred way of connecting the further wires 8a, 8b to the corresponding conductors 6a, 6b of the connecting cable 5. FIG. 9 depicts a B-type connection head unit. The connection head unit comprises a unit body 21 and a unit lid 22 forming a terminal housing. The unit lid 22 is adapted to be screwed to the unit body 21 to enclose an interior of the terminal housing. The terminal housing comprises two screw terminals 23a, 23b electrically connecting both wires 8a, 8b of the further pair of wires to the corresponding conductors 6a and 6b of the connecting cable 5.

Figure 10:
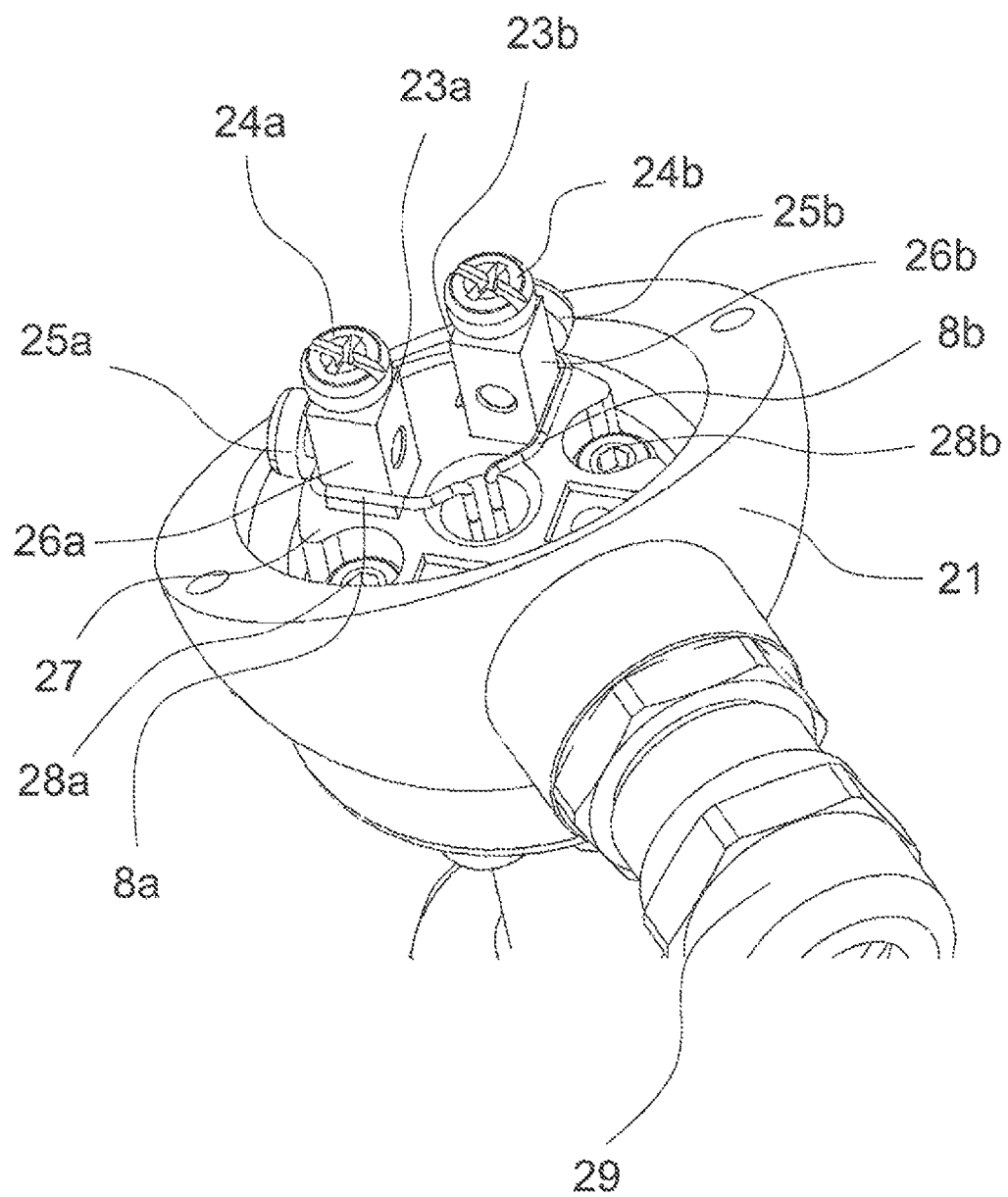
FIG. 10 shows a further view of the terminal housing.

As shown in FIG. 10 in more detail, each screw terminal 23a, 23b comprises two screw sockets 24a, 24b, 25a, 25b, respectively. In one of the screw sockets a further wire 8a, 8b of the wire arrangement is arranged while in the other of the screw sockets a corresponding conductor 6a, 6b of the connection cable 5 is arranged (not shown in FIG. 9). By tightening the corresponding screws of the screw terminals 23a, 23b, the electrical connection between the wires 8a, 8b and the conductors 6a and 6b is established, respectively. This allows easy replacement of further wires 8a, 8b from the wire arrangement or of the connection cable 5 as the screw terminals 23a, 23b provide releasable connections. Furthermore, the screw connection is less likely to break due to vibration, unlike for example permanent connections like welding spots.

To furthermore improve the stability, each further wire 8a, 8b is supported on a surface inside the terminal housing. More specifically, each further wire 8a, 8b is supported on a corresponding side wall surface 26a, 26b of the corresponding screw terminal 23a, 23b. Furthermore, the terminal housing comprises a terminal base plate 27. The terminal base plate carries the two screw terminals 23a, 23b. The terminal base plate 27 may also support the wires 8a, 8b on a surface of the base plate 27. As the further wires 8a, 8b are well supported by one or more surfaces inside the terminal housing, vibrations are less likely to break the further wires 8a, 8b. Two fixation screws 28a, 28b are provided in order to fix the terminal base plate 27 to the unit body 21. This may provide a more stable fixation in case of vibrations then, for example, a glued fixation which may break. Furthermore, this is a comparably low cost solution for fixing the terminal base plate 27 to the unit body 21. The terminal housing furthermore comprises a cable guide 29 for securing the connection cable 5 mechanically to the terminal housing. In addition or in the alternative to supporting the further wires 8a, 8b inside of the terminal housing, the conductors 6a, 6b may be mutatis mutandis supported inside the terminal housing in the same manner.

Figure 11:
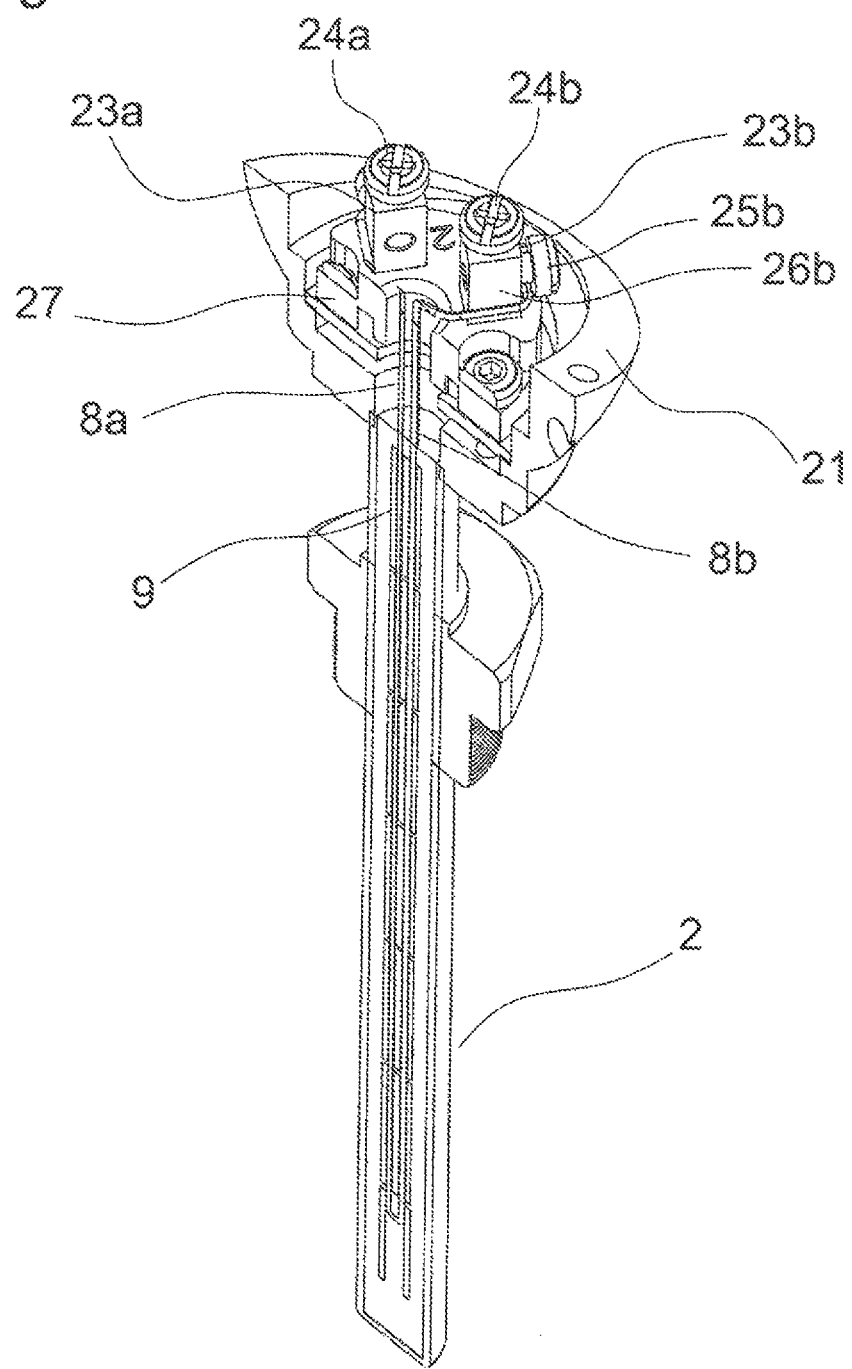
FIG. 11 shows a cross-sectional perspective view of the embodiment comprising the terminal housing.

Finally, FIG. 11 shows a different perspective sectional view of the sensor head 2 and the B-type connection head unit comprising the terminal housing. As can be clearly seen, the further wires 8a, 8b are electrically connected to the corresponding conductors 6a, 6b of the connection cable 5 outside of the tubular wire shielding 9. The screw terminals 23a, 23b replace welding connections for connecting the further wires 8a, 8b to the corresponding conductors 6a, 6b of the connection cable 5.

As follows from the above, the assembling method as claimed will result in an exhaust gas temperature sensor 1 having a good structural stability.

Good stability is reached by using thermocouple wires as conductors 6a, 6b in some embodiments. Thus, there are no joints or welding connections for establishing the electrical connection except the electrical junction itself. The connection cable is stripped and the conductors 6a, 6b are used all way to the temperature measurement sensor 7, passing through the tubular wire shielding 9. Only the tip of the conductors 6a, 6b is welded to form the electrical junction, also known as hot junction or measuring point. In other embodiments, especially where an RTD element is used, further wires 8a, 8b, 11a, 11b pass through the tubular wire shielding 9 and are connected to the conductors 6a, 6b outside of the tubular wire shielding 9. In the alternative, the conductor 6a, 6b passes through the tubular wire shielding 9 and is connected to further wires 8a, 8b, 11a, 11b of the RTD element outside the tubular wire shielding 9. As said connections are established outside the unfavorable environment of the tubular wire shielding 9, stability of the connections is good. Stability is further increased when using two or more coaxially arranged shielding tubes adhered to each other instead of a single shielding tube.

Thus, the present invention provides a tubular wire shielding 9 and an exhaust gas temperature sensor arrangement 1 with good mechanical stability, specifically in situations when vibrations occur that may cause a failure of the temperature measurement arrangement over time. Therefore, reliable temperature measurements up to 1000° C. are possible, preferably temperature measurements in a range between 650° C. and 750° C. This may be useful in vehicles, preferably ships or cars, specifically Diesel driven vehicles.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A tubular wire shielding for an exhaust gas temperature sensor arrangement, the tubular wire shielding comprising a first shielding tube, the first shielding tube comprising one or more through channels for accommodating one or more wires and/or for accommodating one or more temperature measurement sensors, the tubular wire shielding furthermore comprising a second shielding tube radially surrounding the first shielding tube, wherein the tubular wire shielding comprises a first tube adhesive layer arranged interposed between the first shielding tube and the second shielding tube, the first tube adhesive layer fixing the first shielding tube to the second shielding tube, and wherein the tubular wire shielding is configured to shield the exhaust gas temperature sensor arrangement for measurement of temperatures up to 1,000° C.

2. The tubular wire shielding according to claim 1, further comprising a second tube adhesive layer arranged on a side of the second shielding tube opposite the first tube adhesive layer, wherein the second tube adhesive layer comprises sand.

3. The tubular wire shielding according to claim 1, wherein the tubular wire shielding comprising a tubular segment comprises a cavity for accommodating the one or more temperature measurement sensors.

4. The tubular wire shielding according to claim 3, wherein one of the one or more temperature measurement sensors is an RTD-element.

5. The tubular wire shielding according to claim 1, wherein the first tube adhesive layer comprises a ceramic adhesive.

6. The tubular wire shielding according to claim 5, wherein the tubular wire shielding comprises a third shielding tube radially surrounding the second shielding tube, the tubular wire shielding comprising a second tube adhesive layer arranged interposed between the second shielding tube and the third shielding tube, the second tube adhesive layer fixing the second shielding tube to the third shielding tube.

7. The tubular wire shielding according to claim 5, wherein the tubular wire shielding comprises a tubular segment comprising a cavity for accommodating the one or more temperature measurement sensors.

8. The tubular wire shielding according to claim 1, wherein the tubular wire shielding comprising a third shielding tube radially surrounding the second shielding tube, the tubular wire shielding comprises a second tube adhesive layer arranged interposed between the second shielding tube and the third shielding tube, the second tube adhesive layer fixing the second shielding tube to the third shielding tube.

9. The tubular wire shielding according to claim 8, wherein the second tube adhesive layer is different from the first tube adhesive layer regarding a material composition.

10. The tubular wire shielding according to claim 8, wherein the tubular wire shielding comprises a tubular segment comprising a cavity for accommodating the one or more temperature measurement sensors.

11. The tubular wire shielding according to claim 8, wherein the second shielding tube and/or the third shielding tube being a steel tube, the first shielding tube being a ceramic tube.

12. The tubular wire shielding according to claim 11, wherein the second tube adhesive layer is different from the first tube adhesive layer regarding a material composition.

13. The tubular wire shielding according to claim 11, wherein the tubular wire shielding comprises a tubular segment comprising a cavity for accommodating the one or more temperature measurement sensors.

14. An exhaust gas temperature sensor arrangement comprising a tubular wire shielding according to claim 1.

15. An exhaust gas temperature sensor arrangement, the sensor arrangement comprising one or more temperature measurement sensors, a connection cable, a wire arrangement arranged to electrically connect the one or more temperature measurement sensors via the connection cable, the wire arrangement comprising one or more pairs of wires, including a pair of conductors of the connection cable, and one or more tubular wire shieldings, each tubular wire shielding radially surrounding at least one wire of the wire arrangement by providing a through channel accommodating the at least one wire
  wherein the one or more tubular wire shieldings are configured to shield the one or more temperature measurement sensors arrangement for measurement of temperatures up to 1,000° C., and
  wherein
  at least one temperature measurement sensor is an RTD-element, at least one wire of the wire arrangement contacting the RTD element being electrically connected to the RTD element outside of the through channel formed by the tubular wire shielding accommodating the wire and/or accommodating the RTD-element; and/or
  at least one temperature measurement sensor is an electrical junction, the electrical connection from the electrical junction to the pair of conductors comprising less than two welding connections.

16. The exhaust gas temperature sensor arrangement according to claim 15, wherein at least one temperature measurement sensor is an RTD-element and the RTD element is arranged interposed between wires of a wire arrangement electrically connecting the RTD element via the connection cable.

17. The exhaust gas temperature sensor arrangement according to claim 15, wherein the tubular wire shielding comprises two or more tubular segments of the same outer diameter, each of the tubular segments radially surrounding a different section of the at least one wire of the wire arrangement.

18. The exhaust gas temperature sensor arrangement according to claim 15, wherein there are no joints or welding connections for establishing the electrical connection between the at least one wire and the RTD element except for the electrical junction itself.

19. The exhaust gas temperature sensor arrangement according to claim 15, wherein the temperature measurement sensor is electrically connected to at least one of the conductors by a screw connection arranged outside of the through channel.

20. The exhaust gas temperature sensor arrangement according to claim 19, wherein the exhaust gas temperature sensor arrangement comprises a terminal housing, the terminal housing comprising at least one screw terminal electrically connecting the temperature measurement sensor to a corresponding conductor of the connection cable.

21. The exhaust gas temperature sensor arrangement according to claim 20, wherein the at least one wire of the wire arrangement is supported on a surface arranged inside the terminal housing.

22. The exhaust gas temperature sensor arrangement according to claim 15, further comprising a radial sensor housing wall, wherein the wire arrangement comprises two pairs of wires of the one or more pairs of wires, including the pair of conductors and a pair of lines, wherein the pair of lines are connected to the RTD element, wherein the RTD element is interposed between the pair of conductors, wherein the RTD element is interposed between the pair of lines, and wherein the pair of conductors are electrically insulated from the radial sensor housing wall.

23. The exhaust gas temperature sensor arrangement according to claim 22, wherein the pair of lines are arranged within a ceramic adhesive.

24. The exhaust gas temperature sensor arrangement according to claim 22, the one or more tubular wire shieldings comprises a two-hole tubular wire shielding defining a first through channel and a second through channel, wherein one conductor of the pair of conductors is arranged in the first through channel and the other conductor of the pair of conductors is arranged in the second through channel.

* * * * *